United States Patent
Coffey

(10) Patent No.: US 6,422,968 B1
(45) Date of Patent: Jul. 23, 2002

(54) COMPACT SIX SPEED POWER TRANSMISSION

(75) Inventor: Dan Coffey, Howell, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/767,295

(22) Filed: Jan. 22, 2001

(51) Int. Cl.$^7$ .................................................. F16H 3/62
(52) U.S. Cl. ...................................................... 475/275
(58) Field of Search ........................ 275/271, 275–280, 275/288

(56) References Cited

U.S. PATENT DOCUMENTS

| | | | |
|---|---|---|---|
| 5,599,251 A | | 2/1997 | Beim et al. .................. 475/275 |
| 6,071,208 A | * | 6/2000 | Koivunen .................... 475/275 |
| 6,217,474 B1 | * | 4/2001 | Ross et al. .................... 475/269 |

* cited by examiner

Primary Examiner—Paul N. Dickson
Assistant Examiner—C. T. Bartz
(74) Attorney, Agent, or Firm—Leslie C. Hodges; Laura C. Hargitt

(57) ABSTRACT

A powertrain has a multi-ratio power transmission having three axially aligned simple planetary gear sets each of which has a sun gear member, a ring gear member and a planet carrier assembly member. The planetary gear sets are connected between an input shaft and an output shaft by a plurality of radially extending hubs at least four of which are connected with axially extending sleeves. The hubs are disposed axially between the planetary gear sets. The sleeves are disposed radially outboard of the planetary gear sets and are operatively connected with a plurality of torque transmitting mechanisms, also disposed radially outboard of said planetary gear sets, that are selectively operatively controlled to establish six forward drive ratios and one reverse drive ratio between the input shaft and the output shaft. The planet carrier assembly member of the first planetary gear set is continuously connected with the ring gear member of the third planetary gear set. The ring gear member of the first planetary gear set is continuously connected with the input shaft. The sun gear members of the second and third planetary gear sets are continuously interconnected as are the ring gear member of the second planetary gear set and the planet carrier assembly member of the third planetary gear set. The planet carrier assembly member of the second planetary gear set is continuously connected with the output shaft.

7 Claims, 1 Drawing Sheet

RING/SUN RATIOS

| NAME: | R1/S1 | R2/S2 | R3/S3 |
|---|---|---|---|
| RATIO: | 2.00 | 2.00 | 2.00 |

| GEAR STATE | GEAR RATIO | RATIO STEP | 26 | 34 | 36 | 28 | 30 | 32 |
|---|---|---|---|---|---|---|---|---|
| Rev | -2.25 | | X | | | | | G |
| Nev | – | -0.667 | | | | | | |
| 1st | 3.375 | | X | | | G | | |
| 2 nd | 2.250 | 1.500 | | X | | X | | |
| 3 rd | 1.500 | 1.500 | | | X | X | | |
| 4 th | 1.000 | 1.500 | | X | X | | | |
| 5 th | 0.818 | 1.222 | X | | X | | | |
| 6 th | 0.600 | 1.364 | | | X | | | X |

R1=RING 64  R2=RING 54  R3=RING 44
S1=SUN 62   S2=SUN 52   S3=SUN 42

COMPACT SIX SPEED POWER TRANSMISSION

TECHNICAL FIELD

This invention relates to power transmissions and more particularly to multi speed power transmissions having three simple planetary gear sets.

BACKGROUND OF THE INVENTION

It has been proposed, in U.S. Pat. No. 5,599,251 to provide six forward speed ratios and a reverse ratio using three simple planetary gear sets and six friction devices. This patent describes a planetary gear arrangement that has rotating friction devices positioned between the first and second gear sets. The arrangement also requires that two of the stationary friction devices are positioned to control hub members that are also axially disposed between the first and second planetary gear sets. The positioning of these components requires a significant amount of axial space within the transmission housing which results in the overall length of the transmission being quite large.

SUMMARY OF THE INVENTION

It is an object of the present invention to provide an improved compact multi speed power transmission having three simple planetary gear sets.

In one aspect of the invention, the three simple planetary gear sets are controlled by a plurality of selectively engageable friction devices to provide six forward speed ratios, a reverse ratio, and a neutral condition. In another aspect of the present invention, the transmission employs six friction devices that are located radially outboard of the three simple planetary gear sets.

In yet another aspect of the present invention, two of the friction devices are of the rotating type (clutches) and the remaining four friction devices are of the stationary type (brakes). In still another aspect of the present invention, the three planetary gear sets are interconnected in a manner that permits one of the rotating type torque transmitting mechanisms to be positioned radially outboard of the center of the three planetary gear sets.

DESCRIPTION OF AN EXEMPLARY EMBODIMENT

Figures 1, 2:
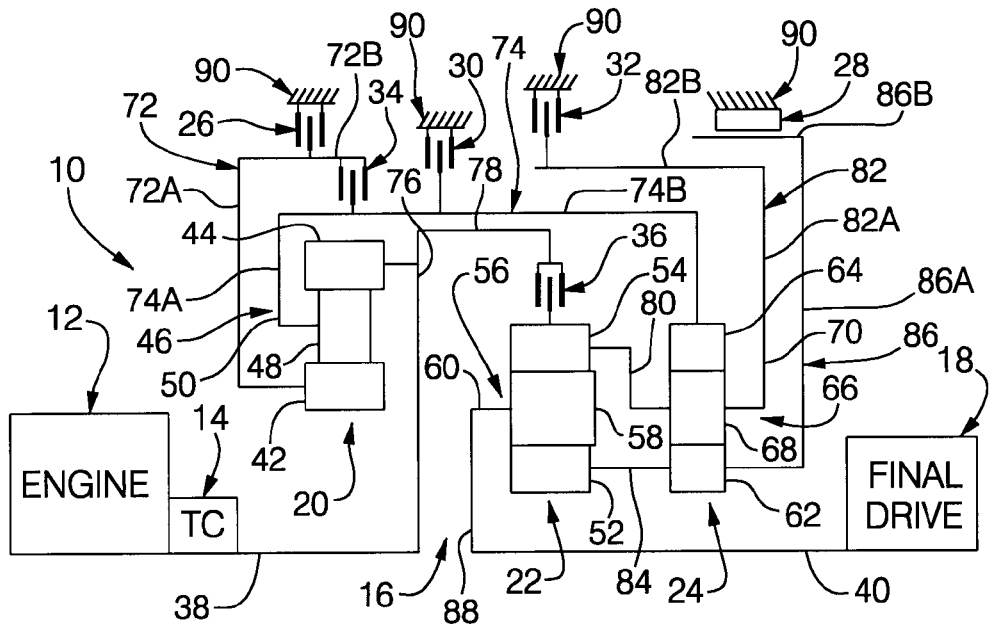
FIG. 1 is a schematic representation of a powertrain having a planetary gear arrangement incorporating the present invention.
FIG. 2 is a truth table describing the operating condition of the various selectively engageable torque transmitting mechanisms of the planetary gear arrangement of FIG. 1 wherein "X" represents an engaged condition, and "G" represents an engagement at vehicle launch.

A powertrain 10 includes a conventional engine 12, a conventional torque converter 14, a planetary gear arrangement 16 and a final drive gearing 18. The planetary gear arrangement 16 has three simple planetary gear sets 20, 22, and 24, four stationary torque transmitting mechanisms (brakes) 26, 28, 30 and 32, two rotating torque transmitting mechanisms (clutches) 34 and 36, an input shaft 38, and an output shaft 40. The torque transmitting mechanisms 26, 28, 30, 32, 34, and 36 are conventional fluid operated, selectively engageable friction devices that are controlled in the engaged and disengaged positions by a conventional electrohydraulic control module, not shown, that includes a programmable digital computer. These control devices are well-known to those skilled in the art of transmission design and manufacture.

The planetary gear set 20 includes a sun gear member 42, a ring gear member 44 and a planet carrier assembly member 46. The planet carrier assembly member 46 has a plurality of pinion gear members 48 rotatably mounted on a planet carrier 50 and meshing with both the sun gear member 42 and the ring gear member 44. The planetary gear set 22 includes a sun gear member 52, a ring gear member 54, and a planet carrier assembly member 56. The planet carrier assembly member 56 has a plurality of pinion gears 58 rotatably mounted on a planet carrier 60 and meshing with both the sun gear member 52 and the ring gear member 54. The planetary gear set 24 includes a sun gear member 62, a ring gear member 64, and a planet carrier assembly member 66 which has a plurality of pinion gear members 68 rotatably mounted on a planet carrier 70 and meshing with both the sun gear member 62 and the ring gear member 64.

The sun gear member 42 is operatively connected with the torque transmitting mechanisms 34 and 26 through a hub and sleeve 72 which includes a radially extending portion 72A and an axially extending portion 72B. The planet carrier 50 of the planet carrier assembly member 46 is operatively connected with a hub and sleeve 74 that is also operatively connected with the torque transmitting mechanisms 30 and 34 and continuously connected to the ring gear member 64. The hub and sleeve 74 includes a radially extending portion 74A and an axially extending portion 74B. The hub and sleeve 74 extends radially and axially outboard of the planetary gear sets 20 and 22. The input shaft 38 is continuously connected with the ring gear member 44 through a radial hub 76 and operatively connected with the torque transmitting mechanism 36 through an axial hub 78. The torque transmitting mechanism 36 is preferably disposed radially outboard of the ring gear member 54 to minimize the axial length of the planetary gear arrangement 16. The ring gear member 54 is operatively connected with the torque transmitting mechanism 36. The ring gear member 54 and the planet carrier 70 of the planet carrier assembly member 66 are continuously interconnected by a radial hub 80.

The ring gear member 54 and the planet carrier assembly member 66 are also continuously connected with a radial hub and sleeve 82 having a radially extending portion 82A, continuously connected with the planet carrier 70, and an axially extending portion 82B, operatively connected with the torque transmitting mechanism 32 which is disposed radially outboard of the planetary gear sets 22 and 24. The sun gear members 52 and 62 are continuously interconnected by a sleeve shaft 84. In the alternative, the sun gear members 52 and 62 can be manufactured as a single unit. The sun gear members 52 and 62 are also operatively connected with the torque transmitting mechanism 28 through a hub and sleeve 86 that has a radially extending portion 86A and an axially extending portion 86B. The planet carrier 60 of the planet carrier assembly member 56 is connected with the output shaft 40 through a radial hub 88. By arranging the interconnections between the planetary gear sets 22 and 24 in the manner described above, the favorable nesting of the torque transmitting mechanism 36 radially outboard of the ring gear member 54 is accomplished. This favorable nesting arrangement of the torque transmitting mechanism 36 minimizes the axial length requirements of the planetary gear arrangement 16.

The planetary gear sets 20 and 22 are separated at most by the two thin radial hub members 76 and 88. The planetary gear sets 22 and 24 are separated at most by the one radial hub 80. As is well known among the transmission artisans, the hub portions 72A, 74A, 76, 80, 82A, 86A and 88 can be designed with splined inner and outer peripheries to permit attachment with the members located radially inward and outward therefrom. The sleeve portion 72B has splined areas to accommodate the torque transmitting mechanisms 26 and 34. The sleeve portion 74B has a splined area to accommodate the torque transmitting mechanism 30. The sleeve 78 has a splined area to accommodate the torque transmitting mechanism 36. The sleeve portion 82B has a splined area to accommodate the torque transmitting mechanism 32. The sleeve portion 86 preferably has a smooth outer periphery to accommodate a conventional band brake 28. As previously mentioned, the torque transmitting mechanisms 26, 28, 30, and 32 are stationary torque transmitting mechanisms. These mechanisms are connected between the respective components of the planetary gear arrangement 16 and a transmission housing 90.

The planetary gear arrangement 16 is controlled by the torque transmitting mechanisms 26, 28, 30, 32, 34, and 36 to provide six forward drive ratios, a neutral condition, and a reverse drive ratio. The torque transmitting mechanisms are engaged in combinations of two during each of the drive ratios and the torque transmitting mechanism 26 remains engaged during the neutral condition. The torque transmitting mechanisms are interchanged in single transition fashion during progression up and down through the forward drive ratios as is evident from the truth table of FIG. 2. The truth table of FIG. 2 also indicates that the double step interchanges (one/three, two/four, three/five, etc) are single transition shifts. This, of course, simplifies the electro-hydraulic control system.

To establish the reverse drive ratio, the torque transmitting mechanisms 26 and 32 are engaged. The torque transmitting mechanism 32 is designated as a garage shift element. This means that this torque transmitting mechanism 32 is engaged to launch the vehicle during reverse operation. With the engagement of the torque transmitting mechanisms 26 and 32, the sun gear member 42, the planet carrier assembly member 66 and the ring gear member 54 are conditioned to be reaction members in the planetary gear arrangement 16. The ring gear member 44, through connection with the input shaft 38, is the input member. The planet carrier assembly member 46 and the ring gear member 64 are driven forwardly (input direction). The sun gear members 62 and 52 and the planet carrier assembly member 56 as well as the output shaft 40 are driven reversely resulting in a reduced reverse drive ratio. The reverse ratio is determined by the tooth ratios of all three planetary gear sets 20, 22 and 24.

To establish the first forward drive ratio, the torque transmitting mechanisms 26 and 28 are engaged. The torque transmitting mechanism 28 is designated as a garage shift element during this ratio. The torque transmitting mechanism 26 can remain engaged through the neutral condition between forward and reverse to simplify the interchange. The sun gear member 42, the sun gear member 62 and the sun gear member 52 are all reaction members during the first forward drive ratio. The ring gear member 44 is an input member during this ratio. The planet carrier assembly member 46, the ring gear member 64, the planet carrier assembly member 66, the ring gear member 54, and the planet carrier assembly member 56 are driven forwardly at reduced speeds relative to the input shaft 38. The first forward drive ratio is a reduction ratio which is determined by the tooth ratios of all three planetary gear sets 20, 22, and 24.

To establish the second forward drive ratio, the torque transmitting mechanisms 26 and 34 are interchanged. The sun gear members 52 and 62 remain as reaction members. The planetary gear set 20 is connected for a direct ratio (sun gear member 42/planet carrier assembly member 46 interconnected) and the ring gear member 64 effectively becomes an input member. The planet carrier assembly member 66 and the ring gear member 54 are driven forwardly at a reduced ratio resulting in the planet carrier assembly member 56 and the output shaft 40 being driven forwardly at a reduced ratio determined by the tooth ratio of the planetary gear sets 24 and 22.

The third forward drive ratio is established by the interchange of the torque transmitting mechanisms 34 and 36. The sun gear member 52 remains as a reaction member and the ring gear member 54 becomes an input member. The planet carrier assembly member 56 and the output shaft 40 are driven forwardly at a reduced ratio determined only by the tooth ratio of the planetary gear set 22.

The fourth forward ratio is established with the interchange of the torque transmitting mechanisms 28 and 34. The planetary gear set 20 is conditioned for a direct (one to one) ratio and rotates at the speed ratio(unity) of the input shaft 38 as does the ring gear member 64. Due to the engagement of the torque transmitting mechanism 36, the ring gear member 54 and the planet carrier assembly member 66 also rotate at unity. This creates a one to one drive ratio between the input shaft 38 and the output shaft 40.

To establish the fifth forward ratio, the torque transmitting mechanisms 34 and 26 are interchanged to establish the sun gear member 42 as a reaction and the ring gear member 54 and the planet carrier assembly member 66 remain connected with the input shaft 38. The planet carrier assembly member 46 and the ring gear member 64 are driven forwardly at a reduced speed ratio determined by the tooth ratio of the planetary gear set 20 and the speed ratio(unity) of the ring gear member 44. The sun gear members 62 and 52 are driven forwardly at an overdrive speed ratio determined by the reduced speed ratio of the ring gear member 64 and the speed ratio(unity) of the planet carrier assembly member 66 and the tooth ratio of the planetary gear set 24. This results in an overdrive speed ratio at the planet carrier assembly member 56 determined by the overdrive speed ratio of the sun gear member 52, the speed ratio(unity) of the ring gear member 54 and the tooth ratio of the planetary gear set 22. The fifth forward drive ratio is an overdrive ratio determined by the tooth ratios of all three planetary gear sets 20, 22, and 24.

To establish the sixth forward drive ratio, the torque transmitting mechanisms 26 and 30 are interchanged. The ring gear member 64 becomes a reaction member and the ring gear member 54 and the planet carrier assembly member 66 remain as input members. The sun gear members 52 and 62 are rotated at an overdrive speed ratio determined by the tooth ratio of the planetary gear set 24. The planet carrier assembly member 56 and the output shaft 40 are driven forwardly at an overdrive speed ratio determined by the speed ratio(unity) of the ring gear member 54, the overdrive speed ratio of the sun gear member 52 and the tooth ratio of the planetary gear set 22. The sixth forward drive ratio is determined by the tooth ratios of the planetary gear sets 22 and 24.

What is claimed is:

1. A powertrain having a multi-ratio power transmission, said transmission having a planetary gear arrangement comprising:

an input shaft;

an output shaft;

a first planetary gear set having first, second, and third rotatable members;

a second planetary gear set having first, second, and third rotatable members;

a third planetary gear set having first, second, and third rotatable members;

said first members of said second and third planetary gear sets being continuously interconnected;

first and second torque transmitting mechanisms disposed radially outboard of said first planetary gear set, said first torque transmitting mechanism being selectively operatively connectable with said first member thereof by a first radially extending hub and a first axially extending sleeve and said second torque transmitting mechanism being selectively connectable between said first member of said first planetary gear set and said third member of said first planetary gear set through said first axially extending sleeve and both a second radially extending hub and a second axially extending sleeve;

a third torque transmitting mechanism disposed radially outboard of and selectively operatively connectable with said second axially extending sleeve, said second axially extending sleeve being continuously drivingly connected with said second member of said third planetary gear set;

a fourth torque transmitting mechanism disposed radially outboard of said second planetary gear set and inboard of said second axially extending sleeve and being drivingly connected with said input shaft by a third radially extending hub disposed adjacent said second planetary gear set and a third axially extending sleeve disposed radially outboard of said second planetary gear set, said fourth torque transmitting mechanism being selectively operatively connectable with said second member of said second planetary gear set;

said input shaft being continuously connected with said second member of said first planetary gear set via said third radially extending hub;

a fourth radially extending hub continuously connected with said third member of said second planetary gear set and said output shaft and being disposed axially between said second planetary gear set and said third radially extending hub, said fourth radially extending hub providing the only drive connection between said output shaft and said planetary gear sets;

a fifth radially extending hub disposed axially between said second planetary gear set and said third planetary gear set and continuously interconnecting said second member of said second planetary gear set and said third member of said third planetary gear set;

a sixth radially extending hub and a fourth axially extending sleeve continuously connected with said third member of said third planetary gear set and being selectively operatively connectable with a fifth torque transmitting mechanism disposed radially outboard of said second and third planetary gear sets; and a seventh radially extending hub and a fifth axially extending sleeve continuously connected with said first member of said third planetary gear set and selectively operatively connected with a sixth torque transmitting mechanism disposed radially outboard of said third planetary gear set.

2. The transmission defined in claim 1 further comprising:
said first member of each of said first, second, and third planetary gear sets being a sun gear member;
said second member of each of said first, second, and third planetary gear sets being a ring gear member; and
said third member of each of said first, second, and third planetary gear sets being a planet carrier assembly gear member.

3. The transmission defined in claim 1 further comprising:
said first, third, fifth, and sixth torque transmitting mechanisms being brakes; and
said second and fourth torque transmitting mechanisms being clutches.

4. A powertrain having a multi-ratio power transmission, said transmission having a planetary gear arrangement comprising:
a transmission housing;
an input shaft;
an output shaft;
a first planetary gear set having first, second, and third rotatable members, said first rotatable member being selectively operatively connectable with said transmission housing by a first torque transmitting mechanism, said first and second rotatable members being selectively interconnected by a second torque transmitting mechanism, said second rotatable member being selectively operatively connectable with said transmission housing by a third torque transmitting mechanism, and said third rotatable member being continuously connected with said input shaft;
a second planetary gear set having first, second, and third rotatable members, said third rotatable member of said second planetary gear set being selectively operatively connectable with said input shaft by a fourth torque transmitting mechanism, said second rotatable member being continuously connected with said output shaft;
a third planetary gear set having first, second, and third rotatable members, said first rotatable member of said third planetary gear set being continuously interconnected with said first rotatable member of said second planetary gear set and selectively operatively connectable with said transmission housing by a fifth torque transmitting mechanism, said second rotatable member of said third planetary gear set being continuously interconnected with said third rotatable member of said second planetary gear set and selectively operatively connected with said transmission housing by a sixth torque transmitting mechanism, said third rotatable member of said third planetary gear set being continuously interconnected with said second rotatable member of said first planetary gear set; and
said six torque transmitting mechanisms being operable in combinations of two to establish six forward drive ratios and one reverse drive ratio in said planetary gear arrangement between said input shaft and said output shaft.

5. The transmission defined in claim 4 further comprising;
said first rotatable members of said first, second, and third planetary gear sets being sun gear members;
said second rotatable members of said first, second, and third planetary gear sets being planet carrier assembly members; and
said third rotatable members of said first, second, and third planetary gear sets being ring gear members.

6. The transmission defined in claim 4 further comprising:
said second and fourth torque transmitting mechanisms are clutches and said first, third, fifth, and sixth torque transmitting mechanisms are brakes.

7. The transmission defined in claim 4 further comprising:
said fourth torque transmitting mechanism being disposed radially between said third rotatable member of said second planetary gear set and said continuous interconnection between said second rotatable member of said first planetary gear set and said third rotatable member of said third planetary gear set.

* * * * *